United States Patent
Evans et al.

(10) Patent No.: US 12,411,361 B2
(45) Date of Patent: Sep. 9, 2025

(54) CONTACT LENS CONTAINING A DIFFRACTIVE OPTICAL ELEMENT AND RELATED METHODS

(71) Applicant: CooperVision International Limited, Fareham (GB)

(72) Inventors: Edward James Harley Evans, Southampton (GB); Robert Oag, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/855,331

(22) PCT Filed: Oct. 16, 2023

(86) PCT No.: PCT/GB2023/052679
§ 371 (c)(1),
(2) Date: Oct. 9, 2024

(87) PCT Pub. No.: WO2024/084191
PCT Pub. Date: Apr. 25, 2024

(65) Prior Publication Data
US 2025/0116885 A1   Apr. 10, 2025

Related U.S. Application Data

(60) Provisional application No. 63/417,347, filed on Oct. 19, 2022.

(51) Int. Cl.
G02C 7/04 (2006.01)
G02C 7/08 (2006.01)
G02C 7/10 (2006.01)

(52) U.S. Cl.
CPC ............. *G02C 7/049* (2013.01); *G02C 7/083* (2013.01); *G02C 7/10* (2013.01)

(58) Field of Classification Search
CPC ........... G02C 7/049; G02C 7/083; G02C 7/10
(Continued)

(56) References Cited

U.S. PATENT DOCUMENTS

| 5,274,663 A | 12/1993 | Stenkvist |
| 5,528,322 A | 6/1996 | Jinkerson |

(Continued)

FOREIGN PATENT DOCUMENTS

| EP | 4057057 A1 | 9/2022 |
| JP | 05011221 A | 1/1993 |

(Continued)

OTHER PUBLICATIONS

International Search Report and Written Opinion issued in corresponding International Patent Application No. PCT/ GB2023/052679 dated Jan. 25, 2024 (15 pages).

(Continued)

*Primary Examiner* — Tuyen Tra
(74) *Attorney, Agent, or Firm* — Kilyk & Bowersox, P.L.L.C.

(57) ABSTRACT

The present disclosure relates to a contact lens (100) including a diffractive optical element (101), an optical filter (103), and an optic axis (109) passing through the optical filter and the diffractive optical element. The diffractive optical element (101) is configured to focus visible light. The optical filter (103) is configured to filter out light with a wavelength of 450 nm to 495 nm. The optical filter (103) may allow through light with a wavelength of 500 nm to 750 nm. The optical filter (103) may include one or more colorants. The present disclosure also relates to a method (600) of manufacturing a contact lens. The present disclosure also relates to a method (700) of correcting the vision of a user.

17 Claims, 8 Drawing Sheets

(58) Field of Classification Search
USPC .............................................. 351/41, 159.03
See application file for complete search history.

(56) References Cited

U.S. PATENT DOCUMENTS

| | | |
|---|---|---|
| 5,543,504 A | 8/1996 | Jinkerson |
| 5,662,707 A | 9/1997 | Jinkerson |
| 5,693,095 A | 12/1997 | Freeman et al. |
| 5,919,880 A | 7/1999 | Imafuku et al. |
| 6,158,862 A | 12/2000 | Patel et al. |
| 6,310,215 B1 | 10/2001 | Iwamoto |
| 6,448,304 B1 | 9/2002 | Kosaka et al. |
| 7,677,725 B2 | 3/2010 | Piers et al. |
| 2010/0312337 A1 | 12/2010 | Zhang et al. |
| 2011/0234974 A1 | 9/2011 | Lawu |
| 2014/0320806 A1 | 10/2014 | Cohen-Tannoudji et al. |
| 2016/0216407 A1 | 7/2016 | Kojima et al. |
| 2016/0223839 A1 | 8/2016 | Kakinuma et al. |
| 2019/0086693 A1 | 3/2019 | Blum et al. |
| 2022/0075210 A1 | 3/2022 | Broad et al. |

FOREIGN PATENT DOCUMENTS

| | | | |
|---|---|---|---|
| JP | 2007181726 A | 7/2007 | |
| JP | 2015509742 A | 4/2015 | |
| WO | 2010064640 A1 | 6/2010 | |
| WO | 2015037627 A1 | 3/2015 | |
| WO | 2015037628 A1 | 3/2015 | |
| WO | WO-2020025355 A1 * | 2/2020 | ............ A61M 21/00 |

OTHER PUBLICATIONS

PCT Demand filed Aug. 7, 2024 in corresponding International Patent Application No. PCT/GB2023/052679 (17 pages).
International Preliminary Report on Patentability issued in corresponding International Patent Application No. PCT/ GB2023/052679 dated Sep. 20, 2024 (14 pages).
Li et al., "Physical Health Education for School-Age Children," 2020, pp. 189-193 (10 pages).
Li, "Fundamentals of photoelectric fire control technology," May 2022, p. 85 (2 pages).
Gu, "The little chestnut of inquiry who asks and learns: 100 science experiments conducted by primary school students themselves," 2020, Part 1, children's science popularization books, pp. 134-135 (6 pages).
"5G Electromagnetic Radiation and Health," 2020, China Institute of Communications, popular science reading materials, pp. 47-50 (10 pages).
Office Action issued in corresponding Japanese Patent Application 2024-563848 dated Jul. 28, 2025 (6 pages).

* cited by examiner

CONTACT LENS CONTAINING A DIFFRACTIVE OPTICAL ELEMENT AND RELATED METHODS

This application is a National Stage Application of PCT/GB2023/052679, filed Oct. 16, 2023, which claims priority to U.S. Patent Application No. 63/417,347, filed Oct. 19, 2022.

FIELD OF THE INVENTION

The present disclosure concerns contact lenses. More particularly, but not exclusively, the present disclosure concerns a contact lens including a diffractive optical element that is configured to focus visible light and an optical filter that is configured to filter out light with a wavelength of 450 nm to 495 nm.

BACKGROUND

Ophthalmic lenses that use refraction to focus visible light on to the retina of a user are well known. Diffractive optical elements are also used to focus light instead of or in addition to use of refraction.

Diffractive optical elements interact with light by diffracting it at the interface between two or more materials each having a different refractive index from each other. Some diffractive optical elements have a diffractive structure made of annular zones arranged to focus incident light to one or more focal points.

A lens containing a diffractive optical element will have much greater chromatic aberration than a refractive lens of the same power. The focal power (in Diopters) of a diffractive optical element varies directly proportionally with wavelength. Focal power is the reciprocal of focal length, therefore the distance light focused from the lens varies inversely proportional to wavelength. This means that for a given annular zone of a diffractive optical element, light with a shorter wavelength will be focused further from the lens than light with a longer wavelength. This relationship gives rise to longitudinal chromatic aberrations. In use, chromatic aberration will result in the user of an ophthalmic lens containing a diffractive optical element experiencing a polychromatic blurred halo around images. This reduces the quality of the user's vision.

The present disclosure seeks to mitigate the above-mentioned problems. Alternatively or additionally, the present disclosure seeks to provide an improved contact lens comprising a diffractive optical element.

SUMMARY

A first aspect of the present disclosure relates to a contact lens including a diffractive optical element, an optical filter and an optic axis passing through the optical filter and the diffractive optical element, wherein: the diffractive optical element is configured to focus visible light and the optical filter is configured to filter out light with a wavelength of 450 nm to 495 nm.

A second aspect of the present disclosure relates to a method of manufacturing a contact lens, comprising: obtaining one or more colorants that absorb light with a wavelength of 450 nm to 495 nm and allow light with a wavelength of 500 nm to 750 nm to pass through; forming a diffractive optical element with a diffractive structure that is configured to focus visible light with a wavelength higher than 495 nm; and forming a contact lens incorporating the diffractive optical element and the one or more colorants.

A third aspect of the present disclosure relates to a method of correcting the vision of a user, comprising: obtaining a contact lens according to the present disclosure; placing the contact lens on the surface of the eye of a user; and the contact lens diffracting light so that the light is focused onto the retina of the eye of the user.

Preferred, but optional, features of the present disclosure are set out below and in the dependent claims.

It will of course be appreciated that features described in relation to one aspect of the present disclosure may be incorporated into other aspects of the present disclosure. For example, the method of the present disclosure may incorporate any of the features described with reference to the apparatus of the present disclosure and vice versa.

DESCRIPTION OF THE DRAWINGS

Example embodiments will now be described, by way of example only, with reference to the accompanying schematic drawings.

DETAILED DESCRIPTION

Figure 1:
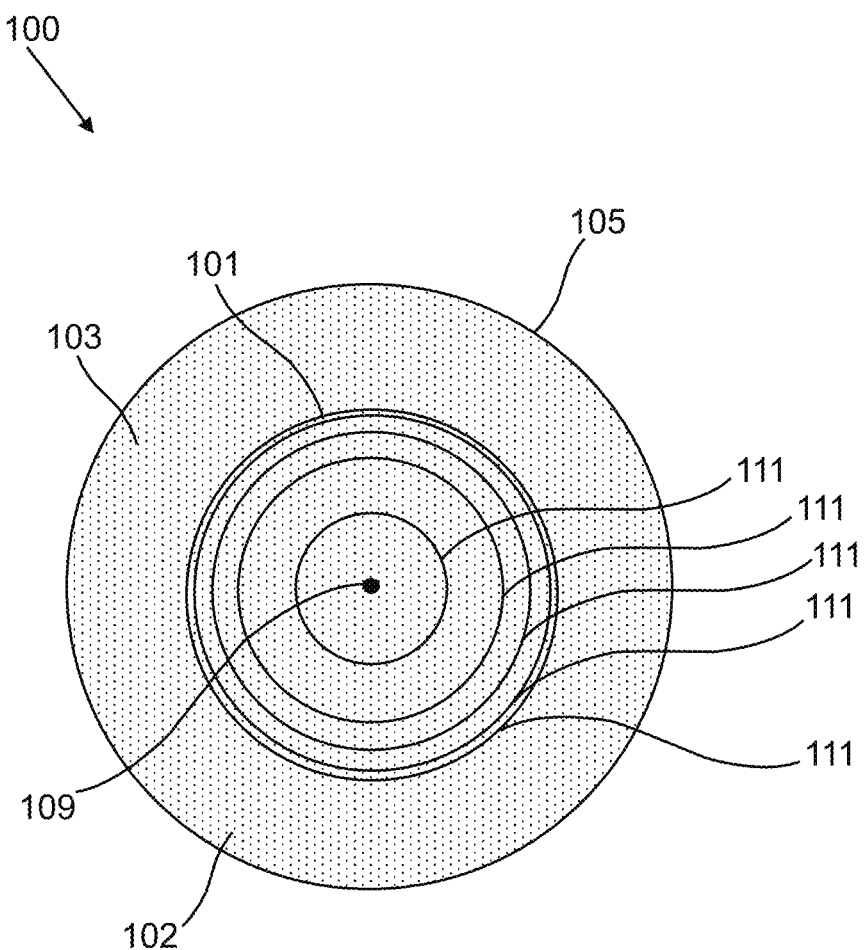
FIG. 1 is a front view of a contact lens in accordance with a first embodiment.

According to a first aspect of the disclosure, the contact lens includes a diffractive optical element, an optical filter and an optic axis passing through the optical filter and the diffractive optical element. The diffractive optical element is configured to focus visible light. The optical filter is configured to filter out light with a wavelength of 450 nm to 495 nm.

As used herein, the term "contact lens" is commonly used in the art to refer to an ophthalmic lens that can be placed on the eye of a person. It will be appreciated that such a contact lens will provide clinically acceptable on-eye movement and not bind to the eye or eyes of a person.

The contact lens has a single diffractive optical element.

The contact lens may be for correcting or improving vision associated with myopia, presbyopia, hyperopia, astigmatism or another refractive anomaly.

The optical filter may allow through, or transmit, light with a wavelength of 500 nm to 750 nm. The optical filter may allow through light with a wavelength of 496 nm to 750 nm. The optical filter may allow through light with a wavelength that is greater than 500 nm. The optical filter may allow through light with a wavelength that is greater than 495 nm.

The optical filter may include one or more colorants. One or more of the colorants may be a dye. One or more of the colorants may be a pigment. One or more of the colorants may be a polymerisable dye. One or more of the colorants may be an anthraquinone dye. One or more of the colorants may be configured to filter out light with a wavelength of 450 nm to 495 nm. One or more of the colorants may be configured to filter out light with a wavelength of 400 nm to 495 nm. A combination of two or more colorants may be configured to filter out light with a wavelength of 400 nm to 495 nm. A combination of two or more colorants may be configured to filter out light with a wavelength of 450 nm to 495 nm.

The optical filter may include one or more compounds. One or more of the compounds may be configured to filter out UV light. One or more of the compounds may be configured to filter out light that is harmful to human eyes. One or more of the compounds may absorb light with a wavelength of 100 nm to 400 nm. One or more of the compounds may absorb light with a wavelength of 400 nm to 450 nm. One or more of the compounds may absorb light with a wavelength of 100 nm to 450 nm. One or more of the compounds may absorb light with a wavelength of 100 nm to 495 nm. A combination of two or more compounds may be configured to filter out light with a wavelength of 100 nm to 495 nm. The optical filter may absorb wavelengths that could be harmful to human eyes. The optical filter may include at least one compound that absorbs UV-light. The skilled person will be aware of suitable UV blocking compounds. The UV-blocking compound may be colourless.

The contact lens may comprise a material having one or more colorants dispersed within it. The contact lens may comprise a material having one or more colorants and one or more compounds dispersed within it. The contact lens may comprise a polymeric material. The contact lens may comprise a polymeric material having one or more colorants dispersed within it. The contact lens may comprise a polymeric material having one or more colorants and one or more compounds dispersed within it. One or more of the colorants may be a polymerisable dye. The contact lens may comprise a polymeric matrix formed from one or more monomers and one or more colorants.

The optical filter may include a first colorant with an absorption maximum wavelength in the range 450 nm to 495 nm and a second colorant with an absorption maximum wavelength in the range 450 nm to 495 nm. The first colorant may have a different absorption maximum wavelength compared to the second colorant.

As used herein, the term "absorption maximum wavelength" is defined as the wavelength at which the colorant has the highest absorbance as measured by UV-visible spectroscopy. This is also known as the characteristic wavelength of the colorant.

The characteristic wavelength of the diffractive optical element may be from 500 nm to 750 nm. The characteristic wavelength of the diffractive optical element is defined as the wavelength at which the diffractive optical element is designed to have a pre-determined focal length.

The optic axis of the lens is defined with reference to a distant point source of light. Light from a distant point source that is on the optic axis of the lens (which may hereafter be referred to as an on-axis distant point source) will be focused onto the optic axis of the lens.

The optic zone is centred on the optic axis. The optic axis may be aligned with the centre of the contact lens. The optic zone consists of parts of the contact lens that have optical functionality in use. The optic zone may be configured to be positioned over or in front of the pupil of an eye when in use. In plan view, the contact lens may have an optic zone surrounded by a peripheral zone. The peripheral zone is not part of the optic zone, but sits outside the optic zone. The peripheral zone may sit above the iris when the contact lens is worn. The peripheral zone may provide a mechanical function, for example, increasing the size of the contact lens thereby making the contact lens easier to handle. The peripheral zone may extend to the edge of the contact lens. The peripheral zone may provide ballasting to prevent rotation of the contact lens, and/or provide a shaped region that improves comfort for the contact lens wearer.

The contact lens may have a circular shape. The contact lens may have an oval shape. The contact lens may have an elliptical shape. The contact lens may have a diameter of 10 mm to 20 mm. The contact lens may have an optic zone having a diameter of 7 mm to 10 mm. The contact lens may have a convex anterior surface. The contact lens may have a concave posterior surface. The optic zone may be circular in shape. The optic zone may be oval in shape. The optic zone may be elliptical in shape.

The diffractive optical element may be centred on the optic axis of the contact lens. In plan view, the diffractive optical element may be surrounded by a peripheral region of the contact lens. The diffractive optical element may be located within the optic zone of the contact lens. The diffractive optical element may define the optic zone of the contact lens.

In a transverse cross-sectional plane that contains the optic axis, the diffractive optical element may comprise a series of peaks and troughs of a first refractive index filled by a material with a second refractive index. The diffractive optical element may comprise two or more materials that each have a different refractive index relative to each other.

The diffractive optical element may include a first portion with a first refractive index and a second portion that includes a liquid crystal cell that is switchable between a matched state and an unmatched state. In the matched state, the refractive index of the liquid crystal cell may be equal to the first refractive index. In the un-matched state the refractive index of the liquid crystal cell may be different to the first refractive index. In the un-matched state the refractive index of the liquid crystal cell may be greater than the refractive index of the liquid crystal cell in the matched state. In the un-matched state, the refractive index of the liquid crystal cell may be less than the refractive index of the liquid crystal cell in the matched state. The liquid crystal cell may be electrically switchable.

In a transverse cross-sectional plane passing through the optic axis, the first portion of the diffractive optical element may include a series of peaks and troughs. The peaks and troughs of the first portion may abut the liquid crystal cell of the second portion. The liquid crystal may be switchable between a matched state in which its refractive index is equal to that of the first refractive index of the first portion, and an unmatched state in which its refractive index is different to that of the first refractive index of the first portion.

In a transverse cross-sectional plane that contains the optic axis, the diffractive optical element may comprise a series of peaks and troughs on its anterior surface which are surrounded by the material of the contact lens. The material of the contact lens may have a different refractive index compared to the refractive index of the diffractive optical element. A boundary between the diffractive optical element and the material of the contact lens may define the diffractive structure of the diffractive optical element.

The diffractive optical element may have a radial variation in refractive index, i.e., the refractive index may vary radially outwards from the optic axis. The diffractive optical element may have an axial variation in refractive index, i.e., the refractive index may vary in the direction of the optic axis. The diffractive optical element may have a refractive index that varies sinusoidally in an axial direction. The diffractive optical element may have a refractive index that varies sinusoidally in a radial direction. The diffractive optical element may have a refractive index that varies linearly in a radial direction. The diffractive optical element may have a refractive index that varies linearly in an axial direction. The diffractive optical element may have a refractive index that increases radially. The diffractive optical element may have a refractive index that decreases radially. The diffractive optical element may have a refractive index that increases axially. The diffractive optical element may have a refractive index that decreases axially. The refractive index of the diffractive optical element may be uniform.

In plan view, the diffractive optical element may comprise concentric annular regions. The concentric annular regions may be centred around the optic axis of the contact lens. Each pair of peaks may define an annular region. Each concentric annular region may define an annular diffractive zone.

The diffractive optical element may be embedded within the contact lens. The contact lens may include a lens body. The diffractive optical element may be embedded within the lens body. The diffractive optical element may have a different refractive index to the refractive index of the lens body. The refractive index of the lens body may be uniform. For example, the first portion of the diffractive optical element may have a refractive index of 1.48, and the second portion of the diffractive optical element may be a liquid crystal cell switchable between a refractive index of 1.48 and 1.7.

The diffractive optical element may include a diffractive structure that diffracts and refracts the light incident upon it.

The contact lens may include a layer containing the optical filter. The layer may form the anterior surface of the contact lens. The layer may form the posterior surface of the contact lens. The contact lens may further include a lens body bonded to the layer containing the optical filter. The layer may have a thickness that is smaller than the thickness of the lens body. The layer may cover the entire anterior surface of the lens body. The layer may cover the entire posterior surface of the lens body. The layer may cover a portion of the anterior surface of the lens body. The layer may cover a portion of the posterior surface of the lens body. The layer may cover a central portion of the anterior or posterior surface of the lens body, for example a portion that is situated in front of the diffractive optical element such that light must pass through the layer in order to be diffracted by the diffractive optical element. There may be a peripheral region of the contact lens that is not covered by the layer.

The contact lens may be a soft contact lens. The contact lens may comprise a silicone hydrogel material. The contact lens may be a rigid gas permeable contact lens. The contact lens may be a toric contact lens. For example, the toric contact lens may include an optic zone shaped to correct for a person's astigmatism. The contact lens may be a daily disposable lens. The contact lens may be an extended wear contact lens.

The contact lens may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, lehfilcon A, and the like.

Alternatively, the contact lens may comprise, consist essentially of, or consist of a silicone elastomer material. For example, the contact lens may comprise, consist essentially of, or consist of a silicone elastomer material having a Shore A hardness from 3 to 50. The Shore A hardness can be determined using conventional methods, as understood by persons of ordinary skill in the art (for example, using a method DIN 53505). Other silicone elastomer materials can be obtained from NuSil Technology or Dow Chemical Company, for example.

According to a second aspect, the present disclosure provides a method of manufacturing a contact lens. The method includes obtaining one or more colorants that absorb light with a wavelength of 450 nm to 495 nm and allow light with a wavelength of 500 nm to 750 nm to pass through. The method includes forming a diffractive optical element with a diffractive structure that is configured to focus visible light with a wavelength higher than 495 nm. The method includes forming a contact lens incorporating the diffractive optical element and the one or more colorants.

The method may also include the step of obtaining one or more compounds that absorb UV light. The step of forming a contact lens may also include incorporating the one or more compounds into the contact lens. The step of forming a contact lens may also include the step of molding a lens body around the diffractive optical element such that the diffractive optical element is embedded in the lens body. The step of forming a contact lens may also include the step of forming a layer incorporating the one or more colorants. The step of forming a contact lens may also include the step of bonding a posterior surface of the layer to an anterior surface of the lens body. The method may also include the step of applying an adhesive to the posterior surface of the layer. The method may also include the step of applying an adhesive to the anterior surface of the lens body. The adhesive may be a transparent adhesive.

According to a third aspect, the present disclosure provides a method of correcting the vision of a user. The method includes obtaining a contact lens according to the disclosure. The method includes placing the contact lens on the surface of the eye of a user. The method includes the contact lens diffracting light so that the light is focused onto the retina of the eye of the user.

The contact lens may be a molded contact lens. The contact lens can be formed, for example, by a cast molding processes, a spin cast molding processes, or a lathing processes, or a combination thereof. As understood by persons skilled in the art, cast molding refers to the molding of a lens by placing a lens forming material between a female mold member having a concave lens member forming surface, and a male mold member having a convex lens member forming surface.

A contact lens 100 (FIG. 1) has a contact lens body 105 formed from silicone hydrogel material. The contact lens 100 includes a diffractive optical element 101 and an optical filter 103 which is formed from a mixture of colorants that together filter out light with a wavelength of 450 nm to 495 nm. The optical filter 103 also absorbs UV wavelengths that are harmful to the human eye. The optical filter 103 allows light with a wavelength of 500 nm to 750 nm to pass through it. The diffractive optical element 101 is centred on the optic axis 109 of the contact lens 100 and extends perpendicular to the optic axis. In plan-view the diffractive optical element 101 is surrounded radially by a peripheral region 102 of the contact lens 100. The optical filter 103 is a mixture of colorants dispersed through the material of the lens body 105 indicated by stippled shading in the drawings. The diffractive optical element 101 is embedded within the lens body 105 so that it is surrounded by the lens body 105 on all sides. In plan view (FIG. 1), the diffractive optical element 101 comprises a series of concentric annular regions 111.

Figure 2:
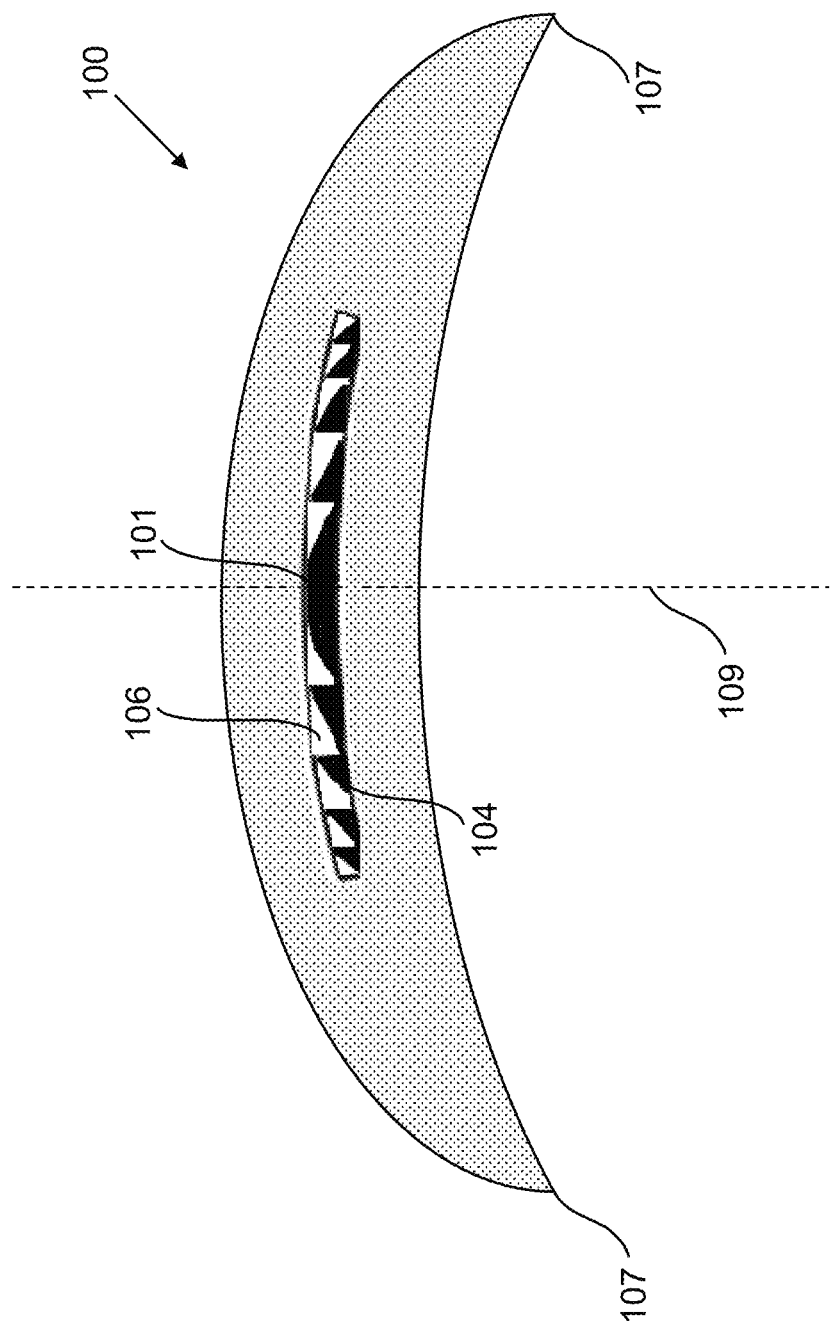
FIG. 2 is a transverse cross-sectional view of the contact lens of FIG. 1.

The diffractive optical element 101 of the contact lens 100 (FIG. 2) includes a first portion 104 with a first refractive index and a second portion 106 comprising a liquid crystal cell which is electrically switchable between a matched state and an unmatched state. In the matched state the liquid crystal cell has a refractive index equal to the first refractive index. In the unmatched state, the liquid crystal cell is "switched" so that it has a refractive index greater than the first refractive index. In the cross-sectional plane shown in FIG. 2, the first portion 104 of the diffractive optical element 101 has a series of peaks extending out from the optic axis 109 of the contact lens 100 towards the peripheral edge 107 of the contact lens. The second portion 106 has a corresponding shape such that is it is aligned with the first portion 104 to create a continuous boundary between the two. When the second portion 106 is in the matched state it has a refractive index equal to that of the first portion 104. When the second portion 106 is in the unmatched state it has a refractive index greater than that of the first portion 104.

A prior art contact lens 200 (FIG. 3) contains a diffractive optical element 201. The contact lens 200 does not contain an optical filter that blocks light with a wavelength of 450 nm to 495 nm, therefore the full wavelength range of visible light is able to pass through the contact lens 200 and is incident on the diffractive optical element 201.

Figure 3:
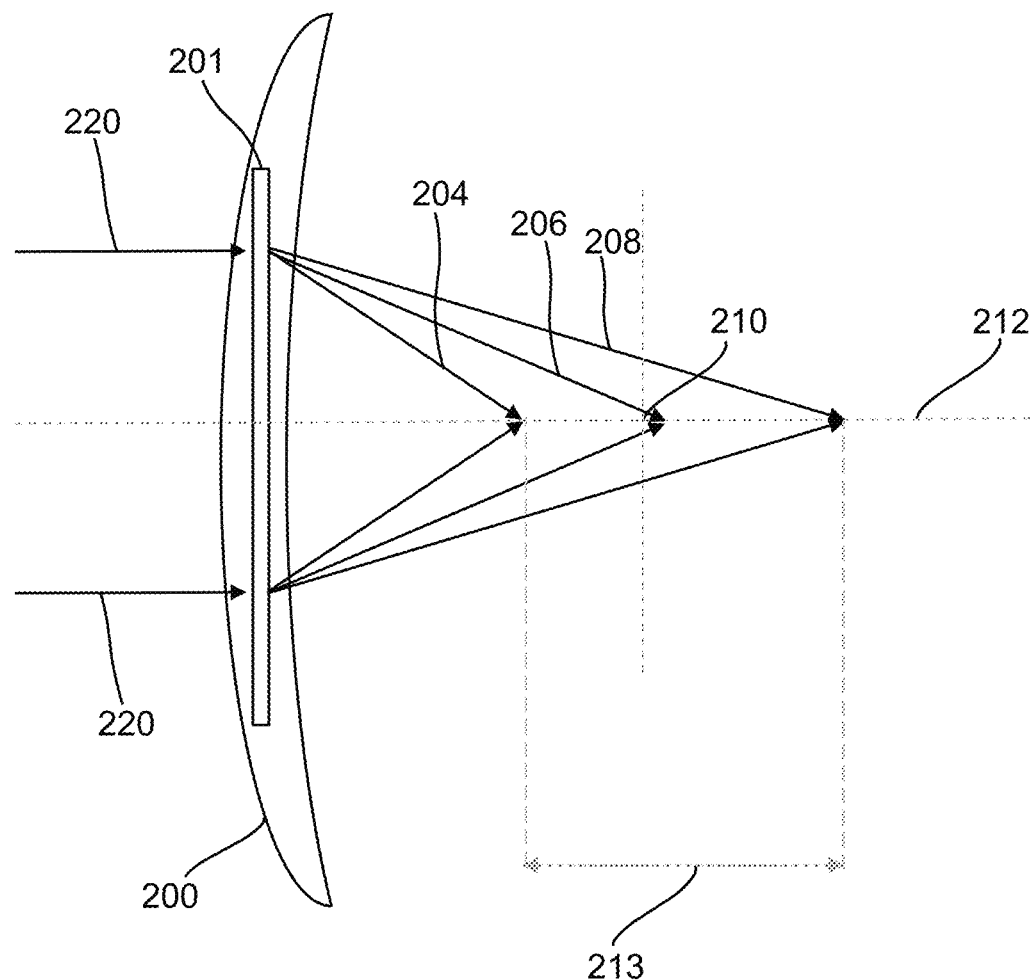
FIG. 3 shows a representation of light passing through a contact lens of the prior art.

FIG. 3 shows a pair of light rays 220 incident on the contact lens 200 according to the prior art. The diffractive optical element 201 diffracts the light incident upon it. The power of a diffractive optical element is given by the following equation:

$$P = 2m\lambda/r^2$$

P is optical power in dioptres, $\lambda$ is wavelength in metres, r is the radius in metres of the mth annular diffractive zone. The power for a given annular diffractive zone of a diffractive optical element varies with wavelength. This relationship gives rise to chromatic aberration.

The diffractive optical element 201 has a characteristic wavelength of 600 nm. The diffractive optical element is designed to focus light with the characteristic wavelength exactly onto a target focal point 210. The target focal point of a contact lens is determined at the time of manufacture. Light that has a shorter wavelength than the characteristic wavelength will be focused slightly further from the contact lens than the target focal point 210. Light that has a longer wavelength than the characteristic wavelength will be focused slightly closer to the contact lens than the target focal point 210. The diagram of FIG. 3 shows a pair of light rays 220 incident on the diffractive optical element 201. An optic axis 212 passes through the centre of the diffractive optical element 201. The target focal point 210 lies on this axis. A light ray 204, representing red light, has a longer wavelength than the characteristic wavelength and is focused closer to the contact lens 200 than the target focal point 210. A light ray 208, representing blue light, has a shorter wavelength than the characteristic wavelength and is focused further from the contact lens 200 than the target focal point 210. A light ray 206, representing green light, is focused between the two, closest to the target focal point 210. The difference in focal distance between the longer wavelength light ray 204 and the shorter wavelength light ray 208 is indicated by dashed arrow 213.

Considering the diffractive optical element in isolation, a first diffractive zone of the diffractive optical element 201 with a diameter of 0.5 mm, has an optical power of 4.8 dioptres at a wavelength of 600 nm. At 450 nm the optical power of the first diffractive zone is 3.6 dioptres. At 750 nm the optical power of the first diffractive zone is 6.0 dioptres. This gives a range of optical power of 2.4 dioptres. Since optical power is the reciprocal of the focal length, the focal distance varies from 0.28 m to 0.17 m which gives a chromatic aberration of 0.11 m.

Figure 4:
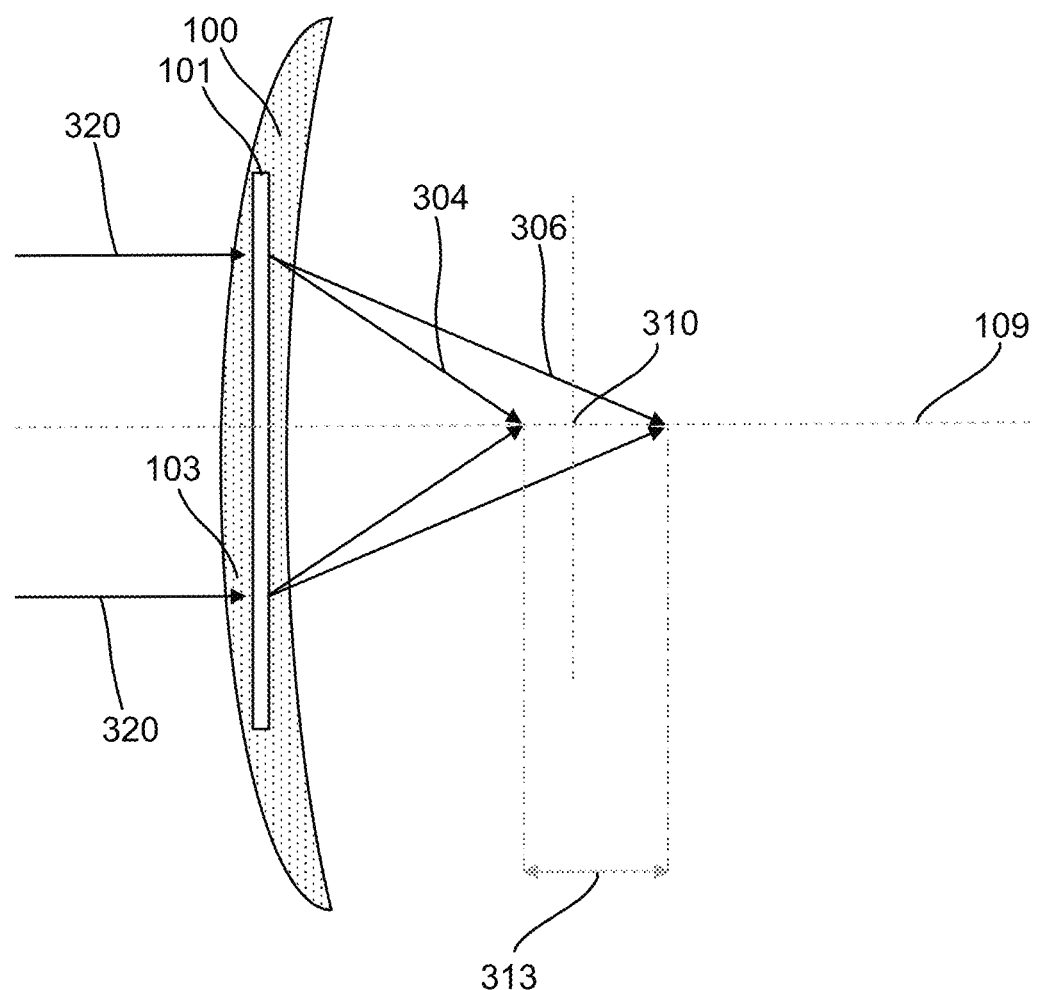
FIG. 4 shows a representation of light passing through the contact lens of FIG. 1 and FIG. 2.

A contact lens 100 according to the present embodiment of the disclosure, includes diffractive optical element 101 which diffracts the light incident upon it (FIG. 4). The contact lens 100 includes the optical filter 103 that filters out light with a wavelength of 450 nm to 495 nm. Visible light with a wavelength of 496 nm to 750 nm is able to pass through the contact lens 100 and be diffracted by the diffractive optical element 101. The diffractive optical element 101 has a characteristic wavelength of 600 nm. The diffractive optical element is designed to focus light with the characteristic wavelength exactly onto a target focal point 310 on the optic axis 109. A pair of light rays 320 are incident on the diffractive optical element 101 having passed through the optical filter 103. A light ray 304, representing red light, having a longer wavelength than the characteristic wavelength, is focused closer to the contact lens 100 than the target focal point 310. A light ray 306, representing the shorter wavelengths of visible light down to a minimum of 496 nm is focused further from the contact lens 100 than the target focal point 310. The difference in focal distance between the longer wavelength light ray 304 and the shorter wavelength light ray 306 is indicated by dashed arrow 313.

Considering the diffractive optical element in isolation, a first diffractive zone of the diffractive optical element 101 with a diameter of 0.5 mm, has an optical power of 4.8 dioptres at a wavelength of 600 nm. At 500 nm the optical power of the first diffractive zone is 4.0 dioptres. At 750 nm the optical power of the first diffractive zone is 6.0 dioptres. This gives a range of optical power of 2.0 dioptres. Since optical power is the reciprocal of the focal length, the focal distance varies from 0.25 m to 0.17 m, which gives a chromatic aberration of 0.08 m.

A comparison of FIG. 4 and FIG. 3 displays how use of the optical filter 103 to block light with a wavelength of 450 nm to 495 nm acts to reduce the visible light spectrum that can pass through the contact lens 100 and therefore reduces the power range of the diffractive optical element 101. Reducing the power range reduces the chromatic aberration produced by the diffractive optical element and decreases the blur around the focal point. This provides a crisper and clearer image for the contact lens user.

Figure 5:
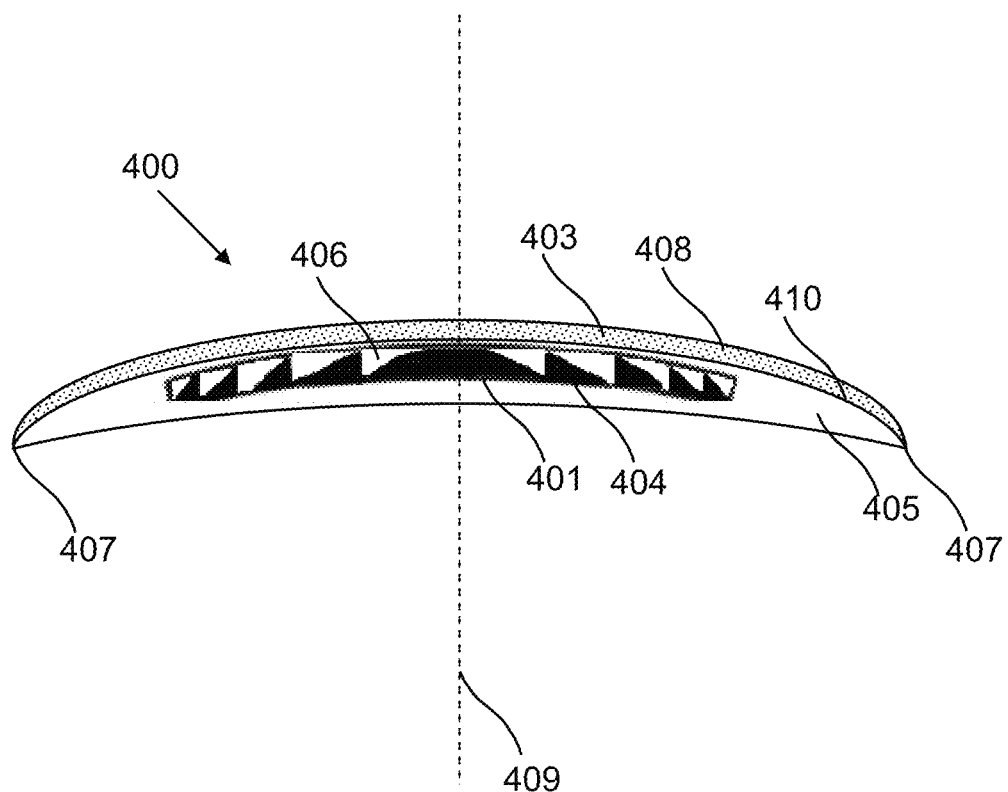
FIG. 5 shows a side-on cross-sectional view of a contact lens according to another embodiment.

A second embodiment of the disclosure will now be described. A contact lens 400 (FIG. 5) includes a diffractive optical element 401 and has other similar features to those described in relation to the first embodiment; the differences will now be described. The contact lens 400 includes a lens body 405 and a layer 408, which contains an optical filter 403. The diffractive optical element 401 is embedded within the material of the lens body 405 and is aligned with the optic axis 409. The layer 408 has dispersed within it a mixture of colorants that together filter out light with a wavelength of 450 nm to 495 nm. The optical filter 403 also absorbs UV wavelengths that are harmful to the human eye. The layer 408 is bonded to the anterior surface 410 of the lens body 405 and covers the entire anterior surface 410 up to the peripheral edge of the contact lens 407. The layer 408 containing the optical filter 403 allows light with a wavelength of 500 nm to 750 nm to pass through it and be diffracted by the diffractive optical element 401.

The diffractive optical element 401 has a first portion 404 and a second portion 406. The first portion 404 has a first refractive index. The second portion 406 is a liquid crystal cell that is switchable between a matched state and an unmatched state. In the matched state, second portion 406 has a refractive index equal to the first refractive index. In the unmatched state (shown in FIG. 5) second portion 406 has a second refractive index greater than the first refractive index. In the cross-section plane shown in FIG. 5, the first portion 404 of the diffractive optical element 401 has a series of peaks extending out from the optic axis 409 of the contact lens towards the peripheral edge 407. The second portion 406 surrounds the peaks of the first portion 404 of the diffractive optical element 401. There is a continuous boundary between the material of the first portion 404 of the diffractive optical element 401 and the second portion 406 of the diffractive optical element 401. In plan view (not shown), the diffractive optical element comprises a series of concentric annular regions. When the second portion 406 of the diffractive optical element 401 is switched to the unmatched state, and therefore has a different refractive index to the first portion 404, each annular region is a diffractive zone defined by a pair of peaks of the diffractive optical element.

Figure 6:
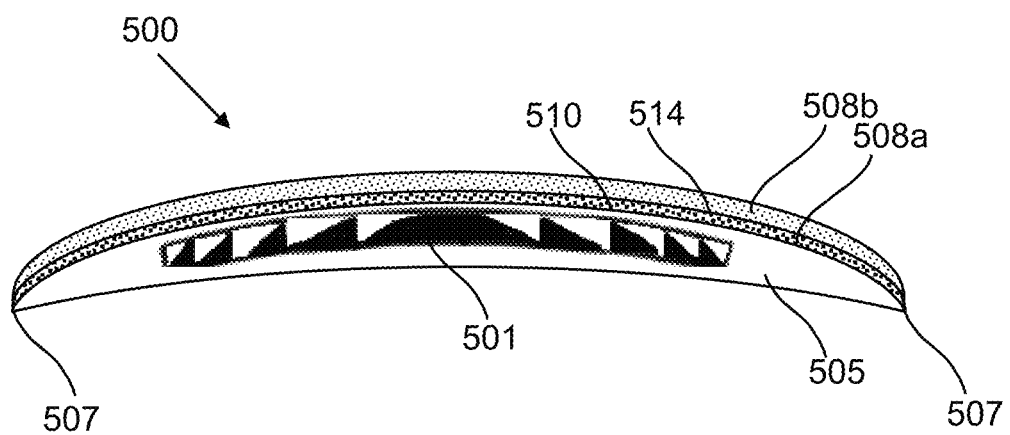
FIG. 6 shows a side-on cross-sectional view of a contact lens according to another embodiment.

A third embodiment of the disclosure differs only slightly from the second embodiment. The differences shall now be described. A contact lens 500 (FIG. 6) includes a diffractive optical element 501, a lens body 505, a first layer 508a and a second layer 508b. The first layer 508a has dispersed within it a mixture of compounds that together filter out UV wavelengths that are harmful to the human eye. The first layer 508a is bonded to the anterior surface 510 of the lens body 505 and covers the entire anterior surface 510 up the peripheral edge 507 of the contact lens 500. The second layer 508b has dispersed within it a mixture of colorants that together filter out light with a wavelength of 450 nm to 495 nm. Both the first and second layers (508a and 508b) allow light with a wavelength of 500 nm to 750 nm to pass through. The second layer 508b is bonded to the entire anterior surface 514 of the first layer 508a.

Figure 7:
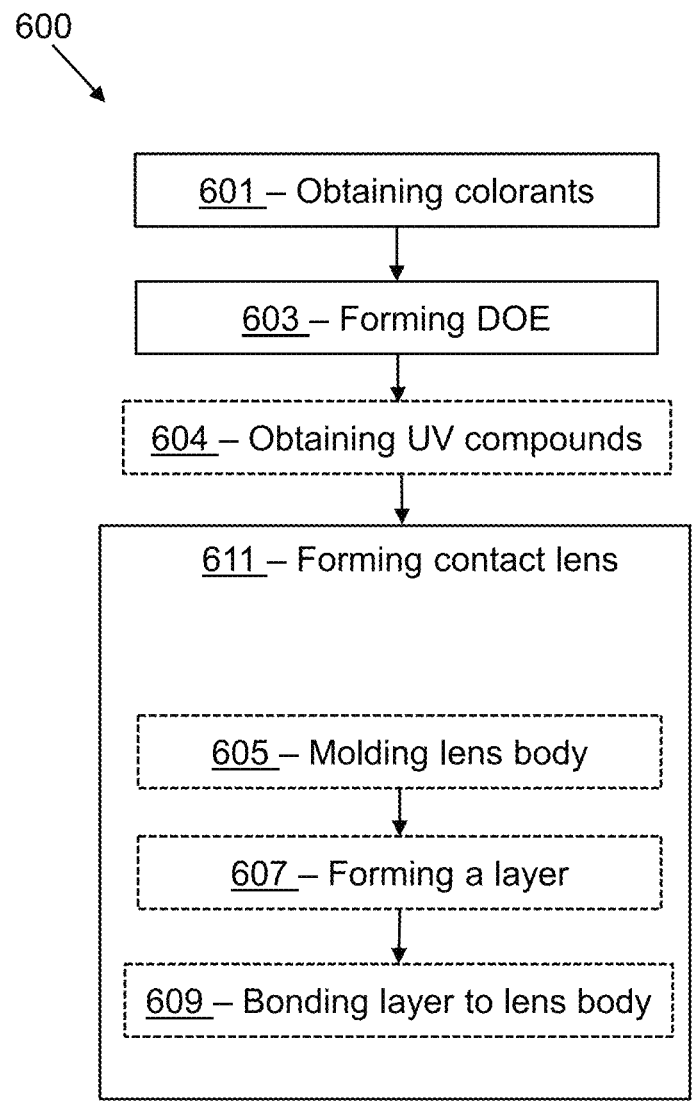
FIG. 7 is a flow diagram of the steps of a method of manufacture of a contact lens according to another embodiment.

According to another embodiment, a method of manufacturing 600 a contact lens comprises the following steps (FIG. 7). A first step 601 comprises obtaining one or more colorants that absorb light with a wavelength of 450 nm to 495 nm and allow light with a wavelength of 500 nm to 750 nm to pass through. Another step 603 comprises forming a diffractive optical element (DOE) with a diffractive structure that is capable of focusing visible light with a wavelength higher than 495 nm. Another step 611 comprises forming a contact lens incorporating the diffractive optical element and the one or more colorants. FIG. 7 represents optional steps in dashed boxes and required steps in solid boxes.

According to other embodiments, the step 611 of forming a contact lens additionally includes the following steps. A step 605 comprises molding a lens body around the diffractive optical element such that the diffractive optical element is embedded in the lens body. A step 607 comprises forming a layer incorporating the one or more colorants. A step 609 comprises bonding the posterior surface of the layer to the anterior surface of the lens body. According to other embodiments, prior to the step 611 of forming the contact lens, the method includes a step 604 of obtaining one or more compounds that absorb UV light.

Figure 8:
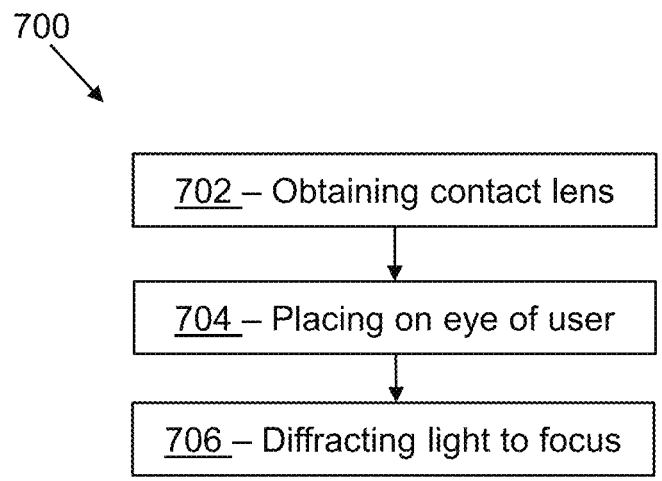
FIG. 8 is a flow diagram of the steps of a method of correcting the vision of a user according to another embodiment.

According to another embodiment, a method 700 of correcting the vision of a user comprises the following steps (FIG. 8). A first step 702 comprises obtaining a contact lens according to the present disclosure. A second step 704 comprises placing the contact lens on the surface of the eye of a user. A third step 706 comprises diffracting light incident on the contact lens so that light is focused onto the retina of the eye of the user.

Whilst the present disclosure has been described and illustrated with reference to particular embodiments, it will be appreciated by those of ordinary skill in the art that the present disclosure lends itself to many different variations not specifically illustrated herein. By way of example only, a possible variation will now be described.

In some alternative embodiments of the disclosure, the contact lens may include a coating. The coating may be applied directly onto the contact lens surface by various coating methods, such as spray coating, spin coating, solution casting, liquid phase surface deposition, or gas phase surface deposition. Prior to applying the coating to the contact lens surface, the contact lens surface may be treated, for example, using plasma treatment, to improve the bonding or adhesion with the coating layer. The coating may include one or more colorants configured to filter out light with a wavelength of 450 nm to 495 nm. The coating may be configured to allow light with a wavelength of 500 nm to 750 nm to pass through. The coating may be an optical filter. The coating may contain one or more compounds configured to absorb UV light.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments of the present disclosure, may not be desirable, and may therefore be absent, in other embodiments.

The invention claimed is:

1. A contact lens including a diffractive optical element, an optical filter and an optic axis passing through the optical filter and the diffractive optical element, wherein:
   the diffractive optical element is configured to focus visible light; and
   the optical filter is configured to block light with a wavelength of 450 nm to 495 nm to reduce the visible light spectrum that can pass through the contact lens.

2. The contact lens according to claim 1, wherein the optical filter allows through light with a wavelength of 500 nm to 750 nm.

3. The contact lens according to claim 1, wherein the optical filter includes one or more colorants.

4. The contact lens according to claim 1, wherein the contact lens comprises a material having one or more colorants dispersed within it.

5. The contact lens according to claim 1, wherein the contact lens includes a layer containing the optical filter.

6. The contact lens according to claim 5, wherein the layer forms the anterior surface of the contact lens.

7. The contact lens according to claim 1, wherein the diffractive optical element is embedded within the contact lens.

8. The contact lens according to claim 1, wherein the diffractive optical element is centred on the optic axis of the contact lens and is surrounded by a peripheral region of the contact lens.

9. The contact lens according to claim 1, wherein the characteristic wavelength of the diffractive optical element is from 500 nm to 750 nm.

10. The contact lens according to claim 1, wherein the optical filter absorbs UV wavelengths.

11. The contact lens according to claim 1, wherein the diffractive optical element includes a diffractive structure that diffracts and refracts the light incident upon it.

12. The contact lens according to claim 1, wherein in a transverse cross-sectional plane passing through the optic axis, the diffractive optical element comprises a series of peaks and troughs of a first refractive index, wherein the troughs are filled by a material with a second refractive index.

13. The contact lens according to claim 1, wherein the diffractive optical element includes a first portion with a first refractive index and a second portion that includes a liquid crystal cell that is switchable between a matched state and an unmatched state, wherein
   in the matched state the refractive index of the liquid crystal cell is equal to the first refractive index; and
   in the unmatched state the refractive index of the liquid crystal cell is different to the first refractive index.

14. A method of correcting the vision of a user, said method comprising:
   obtaining the contact lens according to claim 1;
   placing the contact lens on the surface of the eye of a user; and
   the contact lens diffracting light so that the light is focused onto the retina of the eye of the user.

15. A method of manufacturing a contact lens, comprising:
   obtaining one or more colorants that absorb light with a wavelength of 450 nm to 495 nm and allow light with a wavelength of 500 nm to 750 nm to pass through;
   forming a diffractive optical element with a diffractive structure that is configured to focus visible light with a wavelength higher than 495 nm; and
   forming a contact lens incorporating the diffractive optical element and the one or more colorants to block light with a wavelength of 450 nm to 495 nm to reduce the visible light spectrum that can pass through the contact lens.

16. The method of manufacture according to claim 15, wherein forming the contact lens includes the following method steps:
   molding a lens body around the diffractive optical element such that the diffractive optical element is embedded in the lens body;
   forming a layer incorporating the one or more colorants; and
   bonding the posterior surface of the layer to the anterior surface of the lens body.

17. The method of manufacture according to claim 15, wherein prior to forming a contact lens, the method additionally includes the step of obtaining one or more compounds that absorb UV light and wherein the step of forming a contact lens includes incorporating the one or more compounds into the contact lens.

* * * * *